May 2, 1961  G. W. BERGIN  2,982,576
VEHICLE DOOR LATCH
Filed May 18, 1959  2 Sheets-Sheet 1
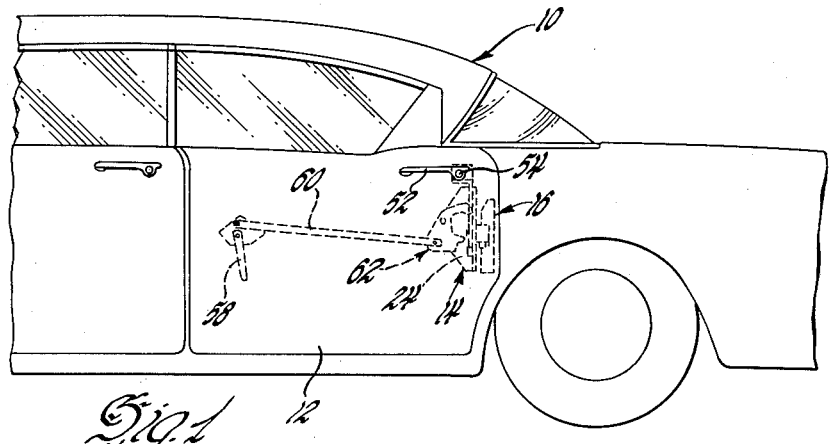
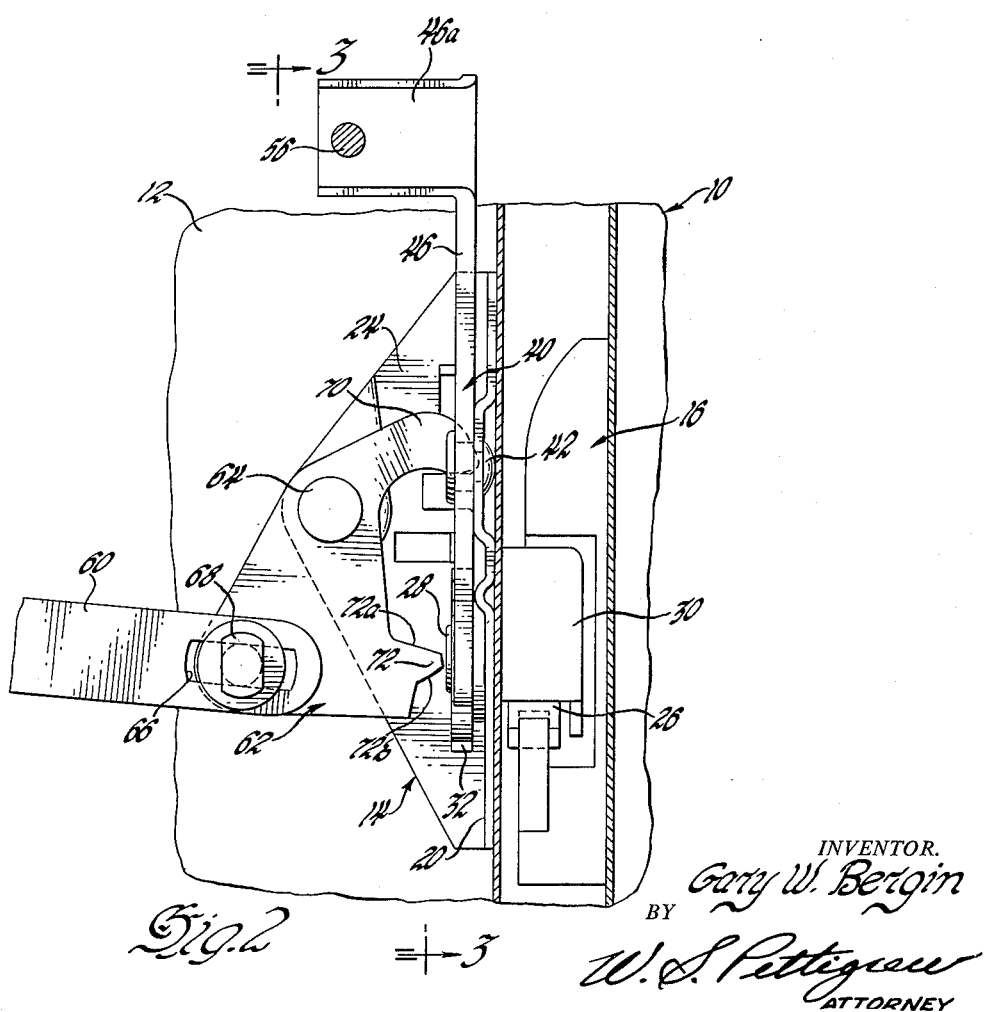
INVENTOR.
Gary W. Bergin
BY
W. S. Pettigrew
ATTORNEY May 2, 1961   G. W. BERGIN   2,982,576
VEHICLE DOOR LATCH
Filed May 18, 1959   2 Sheets-Sheet 2
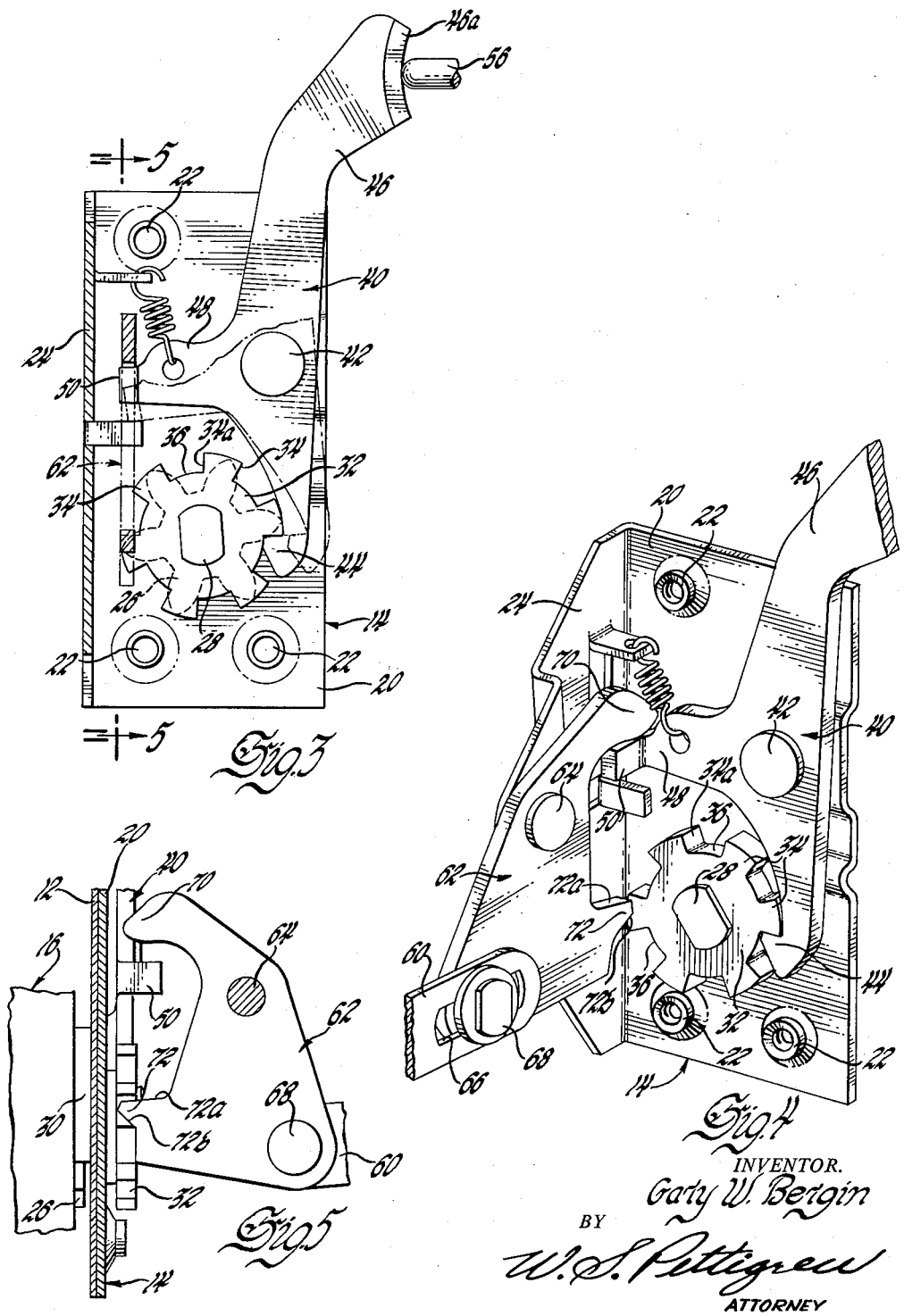
INVENTOR.
Gary W. Bergin
BY
W. S. Pettigrew
ATTORNEY United States Patent Office 2,982,576
Patented May 2, 1961

2,982,576

VEHICLE DOOR LATCH

Gary W. Bergin, Rochester, Mich., assignor to General Motors Corporation, Detroit, Mich., a corporation of Delaware Filed May 18, 1959, Ser. No. 813,845

6 Claims. (Cl. 292—280)

This invention relates to a vehicle door latch, and more particularly to a vehicle door latch wherein locking is accomplished by directly blocking movement of the latching means.

One feature of the invention is that it provides an improved door latch; another feature of the invention is that it provides a vehicle door latch having only three separate operating parts; a further feature of the invention is that it provides a door latch in which the remote or inside operating lever has an operating arm and a locking pawl adapted directly to engage the bolt ratchet; yet another feature of the invention is that the bolt ratchet has teeth, the sides of which are formed on planes intersecting the axis of pivotal movement of the ratchet and the locking pawl of the remote lever has a blocking surface formed on an arc having its center at the axis of pivotal mounting of said lever, whereby the blocking force is exerted in the direction of the axis of pivotal mounting of the lever; and yet another feature of the invention is that the surface of the locking pawl opposite the blocking surface thereof extends at an angle to the ratchet tooth surface which it engages upon movement of the ratchet and bolt in a latching direction, and the pivotal axis of the remote lever is angular to the direction in which force is exerted on the pawl surface, so that said locking pawl is cammed out of engagement with said ratchet tooth upon movement of said ratchet and bolt in a latching direction.

Other features and advantages of the invention will be apparent from the following description and from the drawings, in which:

Fig. 1 is a fragmentary side elevational view of an automobile having the improved latch in the rear door thereof;

Fig. 2 is a fragmentary longitudinal vertical section through a portion of the door and automobile body showing the latch;

Fig. 3 is a transverse section taken along the line 3—3 of Fig. 2;

Fig. 4 is a fragmentary isometric view of the door latch; and

Fig. 5 is a detail section taken along the line 5—5 of Fig. 3 and showing the locking pawl in locked position.

I have devised and am herewith disclosing and claiming a vehicle door latch in which the number of operating parts has been reduced to a minimum, i.e., latching means comprising a bolt and a toothed ratchet rigidly connected thereto and movable as a unit therewith, a combination detent and inside-outside operating member, and a combination remote (inside) operating lever and locking pawl. While other vehicle door latches have been constructed utilizing only these three basic parts, such latches have had disadvantages in that they did not provide for free wheeling of the outside operator when the door was locked, and they were not adaptable for use with a fully rotatable bolt which may move freely through a full circle. In certain of these prior art developments, the outside operating member or detent was physically blocked against movement in order to lock the door from the outside. Arrangements of this type are disadvantageous in that such force may be exerted on the outside push button or handle to break the blocking means or the push button. In the improved door latch which is disclosed and claimed here, the outside operator free wheels when the door is locked and there is no possibility that force exerted on it will break the locking means.

Certain other of the prior art developments of this type were not adaptable for use with a freely rotatable bolt but only with a bolt which is movable between two preset limited positions, that is, latched and unlatched positions. In these prior art latches it was necessary to arrange the parts in such a relationship that when the bolt was in unlatched position and the door was open, it would be impossible to throw the parts into locked position because, prior to this invention, there has been no vehicle door latch having only a bare minimum of parts and including an automatic undogging feature. According to my invention, if the latch parts are moved to locked position while the door is open and the door is then slammed shut, the latch parts will be automatically undogged or moved back to unlocked position.

Referring now more particularly to the drawings, in Fig. 1 an automobile is designated generally as 10. The automobile 10 has a rear door 12 which is hingedly mounted at its front edge on the automobile body in conventional manner and which, adjacent its rear edge, carries a door latch designated generally as 14 having a bolt adapted to engage a striker designated generally as 16 which is mounted on the automobile body adjacent the jamb face of the door.

The latch has a frame with a body portion 20 provided with a plurality of mounting holes 22 for mounting the frame on the jamb face of the door 12 in conventional manner. The frame has a right angular flange portion 24 which extends generally parallel to the inner panel of the door. A latch bolt 26 is rigidly carried on a mounting stud 28 which is journaled between the base portion 20 of the latch frame and the outer wall of a bolt housing 30 carried by said frame. As seen in Fig. 3, the bolt is in the form of a gear and has a plurality of spaced teeth extending entirely around its periphery. As seen in Fig. 2, the bolt is mounted outside the latch frame proper and within the housing 30. Adjacent the inner surface of the latch frame there is a cam 32 which is rigidly mounted on the stud 28 so that the ratchet is rigidly connected to the bolt and moves as a unit therewith. Unless held against movement by latch parts later to be described, the bolt and ratchet are freely rotatable through a full circle. The ratchet is formed with a plurality of spaced ratchet teeth 34 which extend entirely around the periphery of the ratchet and which define notches 36. The opposite side surfaces 34a of the ratchet teeth lie in planes which intersect the axis of pivotal mounting of the ratchet 32.

The teeth of the bolt 26 are adapted to ride over complementary teeth on the striker 16 so that when the latching means is held against movement in an unlatching or door-opening direction and the door is closed, it is held latched. A typical arrangement of a rotary gear bolt of this type and a striker of the type illustrated at 16 are shown and described in Priestman Patent No. 2,852,296, entitled "Rotary Gear Bolt Door Latch." When closed, the door is held in latched position by a detent which is adapted to hold the latching means comprising the bolt and ratchet against movement in an unlatching or door-opening direction. The detent, which is designated generally as 40, is pivotally mounted on the latch frame body 20 by means of a stud 42 and the detent has an arm which extends downwardly from the pivot and terminates in a detent pawl 44. An upwardly extending arm 46 terminates in a right angular flange 46a for operation by outside operating means, and an inwardly extending arm 48 terminates in a turned tab 50 for operation by inside operating means.

As shown in Fig. 1, a gripping handle 52 is fixedly mounted on the door 12 and carries a slidable push button 54. This push button is connected in conventional manner to a push rod 56 which terminates adjacent the flange 46a of the detent arm 46 so that when the push button 54 is pushed inwardly, the detent is swung in a counterclockwise direction (Figs. 3 and 4) to move the detent pawl 44 out of engagement with the ratchet 32 as shown in broken lines in Fig. 3. Unless the latch is locked in a manner later to be described, the ratchet and bolt are now free to rotate in an unlatching direction and the door may be pulled open, this action being assisted by the usual weather strip which is compressed by the door into sealing engagement with the body around the edge of the door.

The door may be opened from the inside by a turn handle 58 which is mounted in conventional manner on the inner door panel and which is connected through a conventional draft link 60 to a remote lever designated generally as 62. The lever 62 is pivotally mounted by a stud 64 on the flange portion 24 of the latch frame. As shown in Figs. 2 and 4, draft link 60 is formed with an elongated slot 66 through which a headed stud 68 on the remote lever projects to provide a lost motion connection, permitting the inside turn handle 58 to return to a central neutral position after it is moved to an unlatching or locking position without disturbing the remote lever 62.

The remote lever 62 has a first arm portion 70 extending adjacent to and overlying the inside operating tab 50 of the detent so that when the inside handle is turned to move the draft link to the left as the parts appear in Figs. 2 and 4, the remote lever is swung in a clockwise direction and the portion 70 of the remote lever picks up the detent and swings it to unlatched position. The remote lever 62 has a second arm comprising a locking pawl 72 which extends toward the ratchet 32 and which, when the inside handle is turned in the opposite direction to move the draft link 60 to the right, enters one of the notches 36 of the ratchet 32 and blocks movement of the ratchet and bolt in the unlatching direction regardless of the position of the detent pawl 44. With the parts in locked position as shown in Fig. 5, the outside operator merely free wheels, that is, when the push button 54 is pushed in, the detent is swung out of engagement with the ratchet, but the locking pawl 72 continues to hold the latching means against rotation in an unlatching direction. Consequently, even if excessive force is exerted on the push button in an attempt to break the latch, no damage will be done which is in contrast to simple latches of this type in the prior art where the detent was physically blocked against movement so that excessive force exerted on the push button could bend or break the locking parts and permit unauthorized entry of the vehicle.

The door latch of this invention, despite its simplicity, includes the desirable feature of automatic undogging, that is, if the latch parts are moved to locked position while the door is open, subsequent closing of the door will shift the parts back to unlocked position so that it is impossible for the operator inadvertently to lock himself out of the vehicle. The upper surface 72a of the locking pawl 72 extends at an angle to the ratchet tooth surface which it engages upon movement of the ratchet and bolt in a latching direction (counterclockwise in Figs. 3 and 4). Also, the pivotal axis 64 of the remote lever 62 is angular to the direction in which force is exerted on the pawl surface 72a, so that the locking pawl 72 is cammed out of engagement with the ratchet notch 36 upon movement of the ratchet and bolt in a latching direction. Such movement occurs when the door is closed as the teeth of the bolt engage and ride over the complementary striker teeth. It should be noted in this connection that the detent pawl 44 is provided with a camming surface to permit the door to be closed without breaking the detent.

The lower or blocking surface 72b of the locking pawl 72 is formed on an arc having its center at the axis 64 of pivotal mounting of the remote lever 62. This construction, in combination with the radial formation of the ratchet teeth side surfaces as above described, results in an arrangement wherein force exerted on the locking pawl 72 by the cam 32 when the cam attempts to move in an unlatching direction is directed toward the pivotal axis of the remote lever so that there is no tendency to cam the remote lever back to unlocked position under these circumstances of operation.

The formation of the two opposite surfaces of the locking pawl 72 as above described provides another advantage in that the locking pawl is tapered, permitting easier access into a notch 36 of the cam when the parts are moved to locked position.

Another feature of this invention is that the construction and arrangement permits the use of a fully rotatable bolt rather than a two-position bolt which moves only between predetermined latched and unlatched positions. Because of the direct engagement of the locking pawl with the cam, the apparatus will operate properly in various positions of the bolt and does not depend upon two predetermined positions of the latching means.

While I have shown and described one embodiment of my invention, it is capable of many modifications. Changes therefore, in the construction and arrangement may be made without departing from the spirit and scope of the invention as set forth in the appended claims.

I claim:

1. A vehicle door latch of the character described, comprising: a frame; latching means pivotally mounted on the frame, comprising a bolt and a toothed ratchet rigidly connected to the bolt and movable as a unit therewith, said ratchet having a plurality of spaced peripheral teeth defining notches therebetween; a detent pivotally mounted on the frame and having an integral first arm formed with a pawl for engaging a notch in said ratchet to block movement of the ratchet and bolt in an unlatching direction and an integral actuating arm; outside operating means comprising a push rod for engaging said actuating arm to pivot said detent to move the pawl out of engagement with said ratchet; and inside operating means comprising a lever pivotally mounted on the frame and having a first portion extending adjacent said detent and adapted to engage the detent and move the pawl out of engagement with said ratchet upon swinging movement of said lever in one direction, and a second arm comprising a locking pawl extending toward said ratchet and adapted, upon swinging movement of said lever in the other direction, to enter one of said notches and block movement of said ratchet and bolt in said unlatching direction regardless of the position of the detent pawl.

2. Apparatus of the character claimed in claim 1, wherein the surface of said locking pawl which blocks movement of the ratchet and bolt in unlatching direction is formed on an arc having its center at the axis of pivotal mounting of said lever.

3. Apparatus of the character claimed in claim 1, wherein the surface of said locking pawl opposite the blocking surface thereof extends at an angle to the ratchet tooth surface which it engages upon movement of the ratchet and bolt in a latching direction and the pivotal axis of said lever is angular to the direction in which force is exerted on the pawl surface, whereby said locking pawl is cammed out of engagement with said ratchet notch upon movement of said ratchet and bolt in a latching direction.

4. A vehicle door latch of the character described, comprising: a frame; latching means pivotally mounted on the frame, comprising a bolt and a toothed ratchet rigidly connected to the bolt and movable as a unit therewith, said ratchet having a plurality of spaced peripheral teeth defining notches therebetween; a detent pivotally mounted on the frame and having an integral first arm formed with a pawl for engaging a notch in said ratchet to block movement of the ratchet and bolt in an unlatching direction and an integral actuating arm; outside operating means comprising a push rod for engaging said actuating arm to pivot said detent to move the pawl out of engagement with said ratchet; and inside operating means comprising a lever pivotally mounted on the frame and having a first portion extending adjacent said detent and adapted to engage the detent and move the pawl out of engagement with said ratchet upon swinging movement of said lever in one direction, and a second arm comprising a locking pawl extending toward said ratchet, and adapted, upon swinging movement of the lever in the other direction, to enter one of said notches and to block movement of said ratchet and bolt in said unlatching direction regardless of the position of the detent pawl, the surface of said locking pawl which blocks movement of the ratchet and bolt in unlatching direction being formed on an arc having its center at the axis of pivotal movement of said lever and the opposite surface of said locking pawl extending at an angle to the ratchet tooth surface which it engages upon movement of the ratchet and bolt in a latching direction and the pivotal axis of said lever is angular to the direction in which force is exerted on the pawl surface, whereby said locking pawl is cammed out of engagement with said ratchet notch upon movement of said ratchet and bolt in a latching direction.

5. Apparatus of the character claimed in claim 4, wherein the opposite side surfaces of said ratchet teeth which define the edges of said notches lie in planes which intersect the axis of pivotal mounting of said ratchet.

6. A vehicle door latch of the character described, comprising: a frame; latching means pivotally mounted on the frame for free swinging movement through a full circle, comprising a bolt having a plurality of latching teeth extending entirely around its periphery and a toothed ratchet rigidly connected to the bolt and movable as a unit therewith, said ratchet having a plurality of spaced teeth extending entirely around its periphery and defining notches therebetween, the opposite end surfaces of said ratchet teeth which define the edges of said notches lying in planes which intersect the axis of pivotal mounting of said ratchet; a detent pivotally mounted on the frame and having an integral pawl for engaging a notch in said ratchet to block movement of the bolt and ratchet in an unlatching direction, said detent having an integral outside operating arm and an integral inside operating arm; outside operating means comprising a push rod adapted to engage said outside operating arm for moving said detent to move the pawl out of engagement with said ratchet; and inside operating means comprising a lever pivotally mounted on the frame and having a first portion overlying the inside operating arm of the detent and adapted to engage said arm and swing the detent to move the pawl out of engagement with said ratchet upon swinging movement of the lever in one direction, and a second arm comprising a locking pawl extending toward said ratchet and adapted, upon swinging movement of said lever in the other direction, to enter one of said notches and block movement of said ratchet and bolt in said unlatching direction regardless of the position of the detent pawl, the surface of said locking pawl which blocks movement of the ratchet and bolt in unlatching direction being formed on an arc having its center at the axis of pivotal mounting of said lever and the opposite surface of said locking pawl extending at an angle to the ratchet toothed surface which it engages upon movement of the ratchet and bolt in a latching direction and the pivotal axis of said lever is angular to the direction in which force is exerted on the pawl surface, whereby said locking pawl is cammed out of engagement with said ratchet notch upon movement of said ratchet and bolt in a latching direction.

References Cited in the file of this patent

UNITED STATES PATENTS

| | | |
|---|---|---|
| 2,034,363 | Wells | Mar. 17, 1936 |
| 2,143,965 | Van Voorhees | Jan. 17, 1939 |
| 2,259,670 | Van Voorhees | Oct. 21, 1941 |
| 2,637,581 | Roethel | May 5, 1953 |
| 2,797,571 | Bargman | July 2, 1957 |
| 2,815,239 | Dingman et al. | Dec. 3, 1957 |
| 2,825,595 | Roethel | Mar. 4, 1958 |